United States Patent [19]

Carabet et al.

[11] 3,773,415

[45] Nov. 20, 1973

[54] RECORD FOR AN AUDIO-VISUAL DEVICE

[75] Inventors: George F. Carabet, Palos Verdes Peninsula; Andrew M. Holland, Santa Monica; Joseph P. Morris, Huntington Beach; William B. Pester, Palos Verdes Peninsula, all of Calif.

[73] Assignee: Mattel, Inc., Hawthorne, Calif.

[22] Filed: July 16, 1971

[21] Appl. No.: 163,160

[52] U.S. Cl. .................... 353/120, 274/1 A, 353/18, 353/19

[51] Int. Cl. .................... G03b 21/00

[58] Field of Search .................... 353/19, 120, 15; 352/26, 37; 274/1 A, 9 R, 14

[56] References Cited

UNITED STATES PATENTS

| | | | |
|---|---|---|---|
| 2,005,914 | 6/1935 | Freund | 352/26 |
| 3,510,966 | 5/1970 | Golden et al. | 274/1 A |
| 2,847,905 | 8/1958 | Novak | 352/37 X |
| 3,017,187 | 1/1962 | Ryan | 274/14 |
| 3,383,114 | 5/1968 | Ryan | 274/1 A |
| 3,529,832 | 9/1970 | Goetz | 274/1 A |
| 3,658,346 | 4/1972 | Stern et al. | 274/9 R |

*Primary Examiner*—Richard M. Sheer
*Attorney*—Seymour A. Scholnick

[57] ABSTRACT

A record for an audio-visual device includes a recorded-message carrier portion and a picture carrier portion immovable with respect to each other and including a plurality of interleaved sound tracks having spaced-apart lead-in grooves with pictures mounted on the picture carrier in locations having the same spaced-apart relation as the lead-in grooves so that indexing of the record to bring a particular picture into viewing position automatically brings the correct lead-in groove into playing position.

4 Claims, 3 Drawing Figures

INVENTORS
GEORGE F. CARABET
ANDREW M. HOLLAND
JOSEPH P. MORRIS
WILLIAM B. PESTER

BY Max E. Shirk

ATTORNEY

INVENTORS
GEORGE F. CARABET
ANDREW M. HOLLAND
JOSEPH P. MORRIS
WILLIAM B. PESTER

BY Max E. Shirk

ATTORNEY

RECORD FOR AN AUDIO-VISUAL DEVICE

BACKGROUND OF THE INVENTION

The background of the invention will be set forth in two parts.

Field of the Invention

The invention pertains generally to audio-visual devices and more particularly to an improved record for an audio-visual device.

Description of the Prior Art

There are a number of different types of records for audio-visual devices. One such record is shown at FIG. 1 in U.S. Pat. No. 2,005,914. This record includes a recorded-message carrier and a picture carrier which is immovable with respect to the recorded-message carrier. Different pictures are brought into view by indexing the record to different rotated positions. Sounds are reproduced by a rotating tone arm. However, there is no way to automatically play the correct sound track for a particular picture except by playing the record sequentially, starting with the first picture and sound track and playing the record through to the end.

SUMMARY OF THE INVENTION

In view of the foregoing factors and conditions characteristic of records for audio-visual devices, it is the primary object of the present invention to provide a new and useful record of this type which exemplifies improvements over the prior art.

Another object of the present invention is to provide a record of the type described which includes a recorded-message carrier having a plurality of interleaved sound tracks including spaced-apart lead-in grooves.

A further object of the present invention is to provide a record of the type described which includes a picture carrier immovably mounted on a recorded-message carrier and a plurality of pictures mounted on the picture carrier with at least some of the pictures being located in the same spaced-apart relation as the lead-in grooves.

According to the present invention, an improved record for an audio-visual device is provided and includes a recorded-message carrier having a plurality of interleaved sound tracks including spaced-apart lead-in grooves.

A picture carrier is immovably mountd on the recorded-message carrier and a plurality of pictures are mounted on the picture carrier with at least some of the pictures being located in the same spaced-apart relation as the lead-in grooves on the recorded-message carrier so that indexing of the record to bring a particular picture into viewing position automatically brings the lead-in groove for the correct recorded message into playing position.

The record is shown for purposes of illustration, but not of limitation, as being in combination with an audio-visual device which includes indexing means for indexing the record to bring particular pictures into viewing position. The device includes a rotating tone arm so that the record may remain stationary during viewing of the pictures and reproduction of the recorded sounds related to the pictures.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENT

Figure 3:
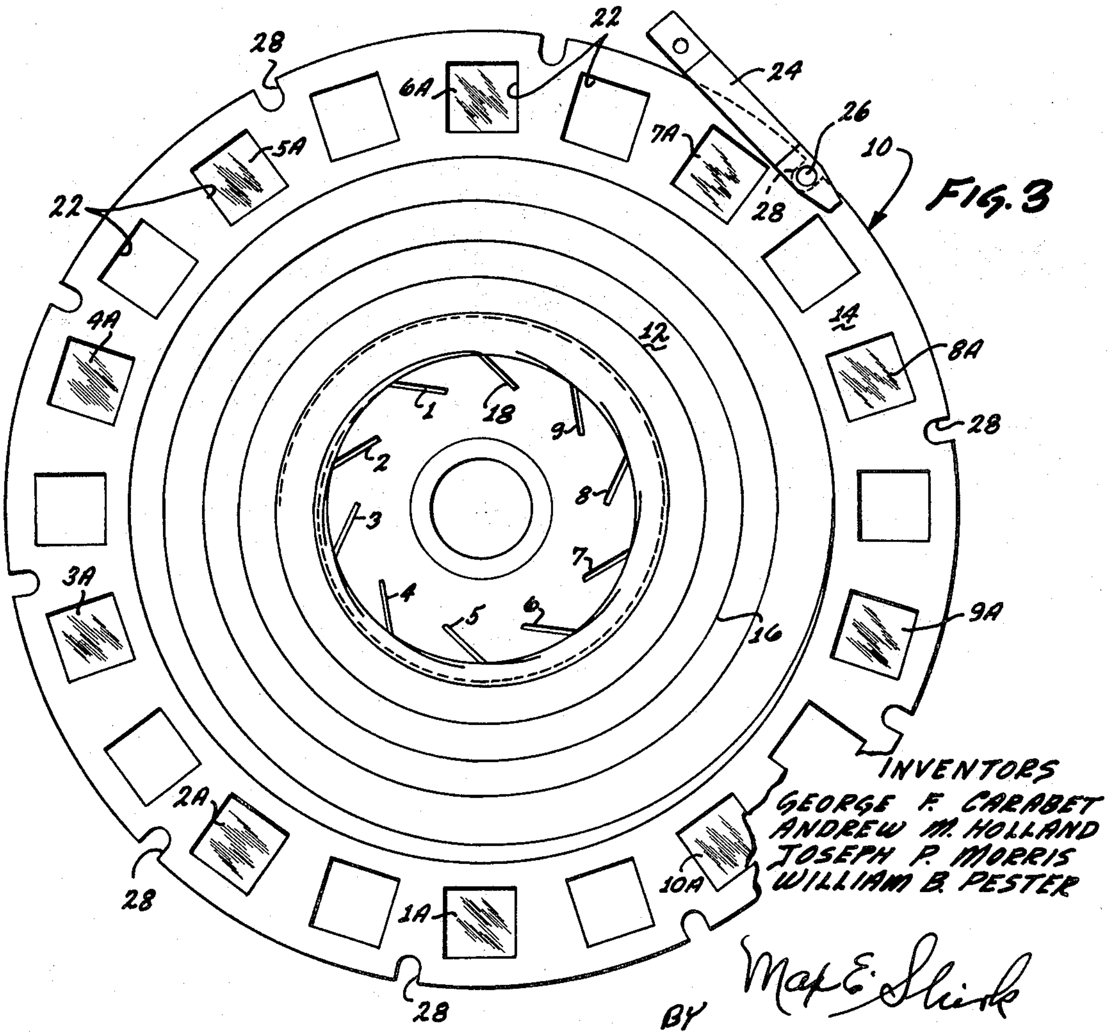
FIG. 3 is a partial, enlarged plan view of a record of the present invention.

Referring again to the drawings, and particularly to FIG. 3, a record constituting a presently-preferred embodiment of the invention, generally designated 10, includes a recorded-message carrier portion 12 and a picture carrier portion 14.

The recorded-message carrier 12 is provided with a plurality of interleaved sound tracks, like the one shown at 16. Each sound track includes a spaced-apart lead-in groove like the one shown at 18 for lead-in groove 16. Nine additional circumferentially-spaced lead-in grooves are also shown and are identified by the numerals 1–9, inclusive. The lead-in grooves are uniformly spaced about the inner periphery of record 12.

Picture carrier 14 is immovably mounted on recorded-message carrier 12 and may be formed integrally therewith, if desired. A plurality of picture-receiving apertures 22 are provided in picture carrier 14 for receiving pictures to be projected by a device to be hereinafter described. Openings 22 may correspond in number to the lead-in grooves or, alternatively, there may be twice as many openings as there are grooves, as shown in the drawings for purposes of illustration, but not of limitation, so that record 10 may be provided with sound tracks on both sides. The pictures for the side of record 10 which carries sound track 16 are identified herein by the numerals 5A–9A, inclusive. The pictures are mounted in a spaced-apart relationship which is coordinated with the spaced-apart relationship of the lead-in grooves so that indexing of record 10 to bring a particular picture into viewing position automatically positions the correct lead-in groove in playing position.

Record 10 may be indexed by a suitable indexing means, like the one shown schematically at 24. Indexing means 24 includes an indexing finger 26 which engages notches 28 provided on the outer periphery of record 10. These notches are so related to the stroke of the indexing means 24 that one stroke thereof rotates record 10 the required amount to bring the next picture into viewing position while automatically bringing the lead-in groove for the sound track related to the picture into playing position.

Figure 1:
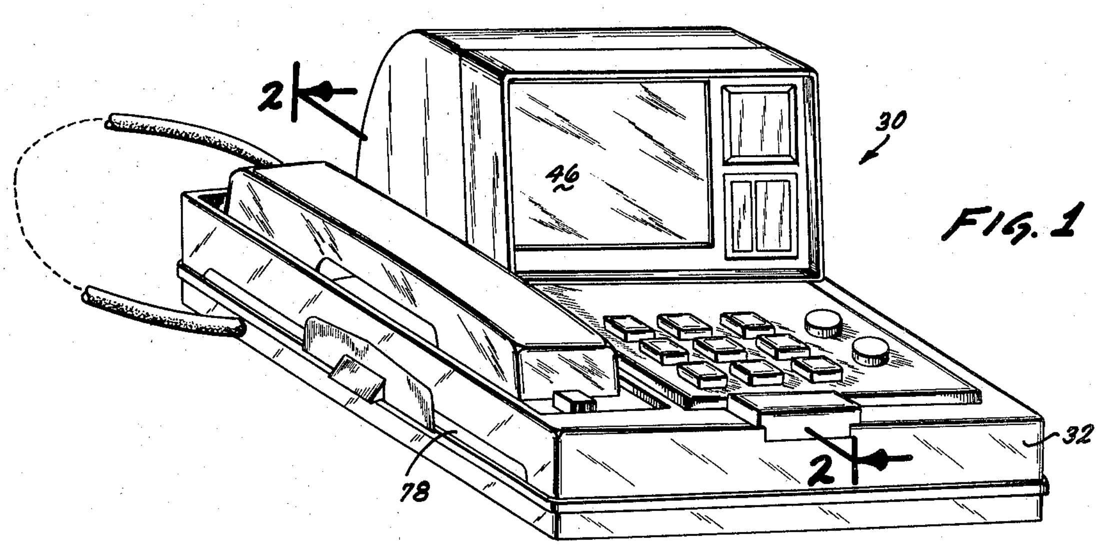
FIG. 1 is a perspective view of an audio-visual device incorporating a record of the present invention.
Figure 2:
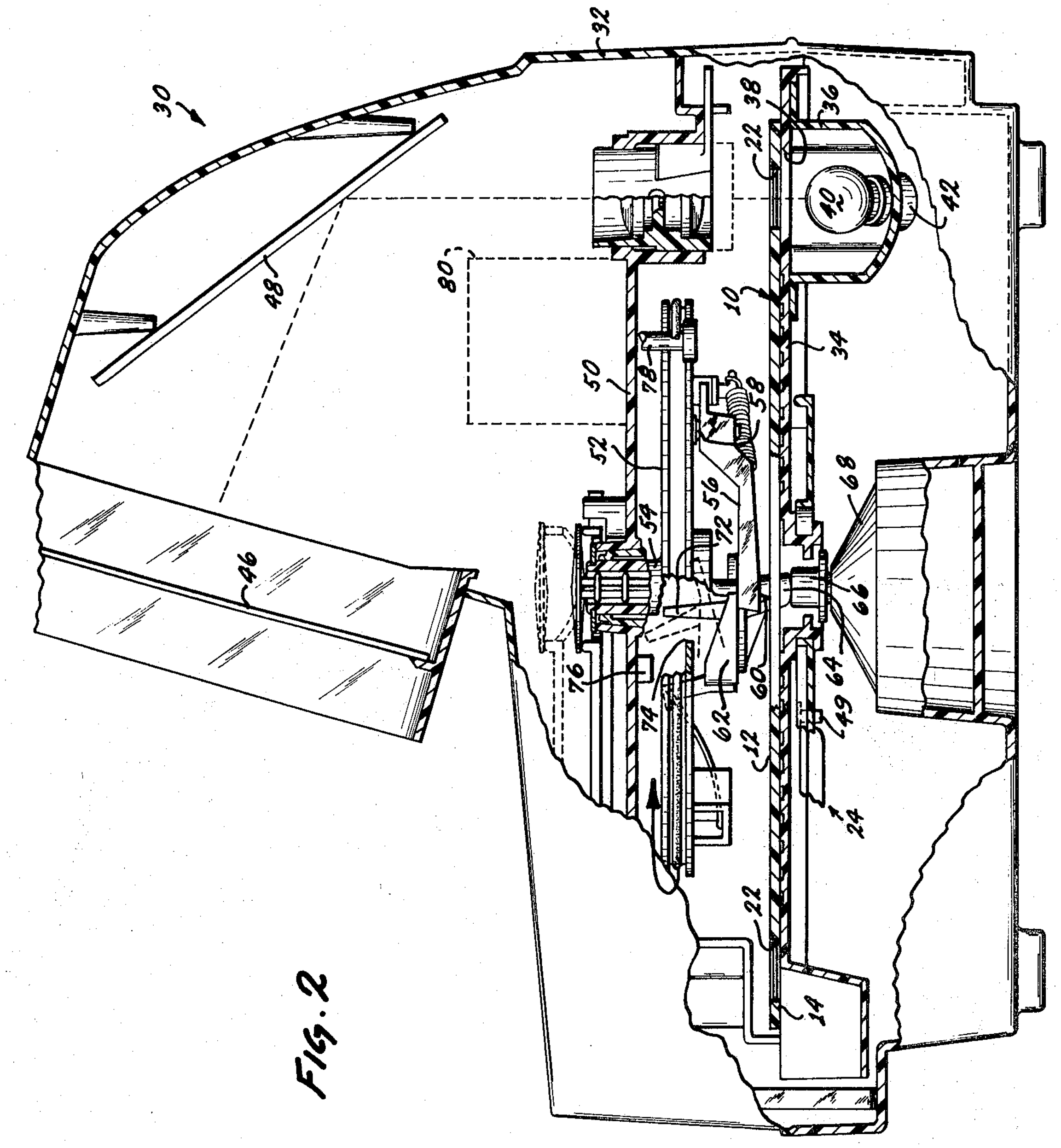
FIG. 2 is an enlarged, cross-sectional view taken along line 2—2 of FIG. 1.

Referring now to FIGS. 1 and 2, record 10 may be used in an audio-visual device 20 including a housing 32 in which is mounted a horizontal partition 34. A suitable reflector 36 depends from partition 34 beneath an opening 38 provided therein for permitting passage of reflected light from a bulb 40 received in a socket 42 carried by reflector 36.

A suitable lens system is mounted in housing 32 above opening 38 for receiving light from reflector 36 and projecting it onto a screen 46 mounted in housing 32 opposite a mirror 48 which receives light from reflector 36 and reflects it onto screen 46.

Record 10 may be supported by partition 34 in such a position that an opening 22 may be aligned with opening 38 in partition 34 when record 10 is indexed by indexing means 24, which may be swingably supported in housing 32 by a pin or post 49 depending from partition 34.

An upper partition 50 is also mounted in housing 32 for rotatably supporting a tone arm-carrying member 52 rotatably mounted on a spindle 54 depending from partition 50. A tone arm 56 is rotatably connected to tone arm-carrier 52 by a post 58 and carries a needle 60 adapted to track the sound tracks provided on record 10. Tone arm 56 may be lifted from record 10 by a tone arm lifter 62 which carries a protuberance 64 adapted to engage a slidable piston 66 on a speaker cone 68 for transmitting vibrations received from tone arm 56. Tone arm lifter 62 carries an upstanding post 72 adapted to engage an opening 74 in tone arm carrier 52 when tone arm lifter 62 is automatically tripped to its broken line position at the end of play. Post 72 then engages a fixed stop 76 depending from housing 32 so that tone arm 56 will always stop at the same rotated position at the end of play. This fixes the position of needle 60 in such a manner that the lead-in grooves for the message related to the particular picture in position over opening 38 will be played. Thus, regardless of which picture is rotated into position by indexing means 24, the lead-in groove related to that picture will be engaged by needle 60 when the audio-visual device is energized.

Tone arm carrier 52 may be rotated by the output shaft 78 of a motor 80 carried by partition 50.

Record 10 may be inserted into housing 32 through a suitable opening 78 provided in housing 32.

Operation of the device will be readily understood. A record 10 may be inserted through opening 78 into housing 32 where it is supported by partition 43.

Indexing means 24 may then be actuated to bring a predetermined picture into position over opening 38. This automatically positions the correct lead-in groove under needle 60. Tone arm lifter 66 may then be swung to its solid-line position where protuberance 64 engages speaker cone 68 and needle 60 engages record 10 for transferring vibrations from record 10 to cone 68 through tone arm lifter 66 and protuberance 64.

Swinging of tone arm lifter 62 closes electrical circuits to motor 80 and bulb 40 so that device 32 will be energized when tone arm lifter 62 is brought to its operating position.

Although a specific embodiment of the invention has been described in detail, other organizations of the embodiment may be made within the spirit and scope of the invention.

Accordingly, it is intended that the foregoing disclosure and drawings shall be considered only as illustrations of the principles of this invention and are not to be construed in a limiting sense, and the scope of this invention is to be defined by the scope of the following claims.

What is claimed is:

1. A record for an audio-visual device, comprising:
a recorded-message carrier disc having a plurality of interleaved sound tracks having circumferentially spaced-apart lead-in grooves;
a picture carrier immovably mounted on said recorded-message carrier; and
a single circular series of a plurality of pictures mounted on said picture carrier, all of said pictures having the same circumferential and radial relation to associated lead-in grooves, whereby indexing of said record to bring a particular picture into a viewing position automatically brings its associated one of said lead-in grooves into a predetermined position.

2. A record as stated in claim 1 including indexing means on said record.

3. A record as stated in claim 1 wherein said record is a disc having an inner circle of sound tracks and an outer circle of pictures and wherein said indexing means comprises notches uniformly spaced about the outer periphery of said record.

4. A record as stated in claim 3 wherein said pictures and lead-in grooves are circumferentially spaced.

* * * * *